(12) United States Patent
Greenfield et al.

(10) Patent No.: US 9,781,054 B1
(45) Date of Patent: Oct. 3, 2017

(54) QUOTA-BASED RESOURCE SCHEDULING

(71) Applicant: Google Inc., Mountain View, CA (US)

(72) Inventors: Lawrence E. Greenfield, New York, NY (US); Sean Quinlan, Palo Alto, CA (US); Priyanka Gupta, Jersey City, NJ (US)

(73) Assignee: Google Inc., Mountain View, CA (US)

( * ) Notice: Subject to any disclaimer, the term of this patent is extended or adjusted under 35 U.S.C. 154(b) by 27 days.

(21) Appl. No.: 14/810,187

(22) Filed: Jul. 27, 2015

Related U.S. Application Data

(60) Provisional application No. 62/029,314, filed on Jul. 25, 2014.

(51) Int. Cl.
*G06F 15/173* (2006.01)
*H04L 12/923* (2013.01)
*H04L 12/911* (2013.01)

(52) U.S. Cl.
CPC .......... *H04L 47/762* (2013.01); *H04L 47/821* (2013.01)

(58) Field of Classification Search
USPC ................................................. 709/226, 228
See application file for complete search history.

(56) References Cited

U.S. PATENT DOCUMENTS

| 8,046,378 | B1* | 10/2011 | Zhuge ............... | G06F 17/30082 707/783 |
| 8,612,990 | B1 | 12/2013 | Khesin et al. | |
| 9,384,056 | B2* | 7/2016 | Lipchuk ................ | G06F 9/505 |
| 2005/0193023 | A1* | 9/2005 | Ismail .................. | G06F 9/5016 |
| 2008/0244576 | A1* | 10/2008 | Kwon .................. | G06F 9/5016 718/1 |
| 2009/0138327 | A1* | 5/2009 | Sakuma ................ | G06Q 10/08 705/7.29 |
| 2014/0075029 | A1* | 3/2014 | Lipchuk ................ | G06F 9/505 709/226 |

OTHER PUBLICATIONS

"Round-robin scheduling," From Wikipedia, the free encyclopedia, last modified on Nov. 2, 2015 [retrieved on Jan. 6, 2016]. Retrieved from the Internet: URL<https://en.wikipedia.org/wiki/Round-robin_scheduling>, 5 pages.

(Continued)

*Primary Examiner* — Jude Jean Gilles
(74) *Attorney, Agent, or Firm* — Fish & Richardson P.C.

(57) ABSTRACT

The present disclosure relates to dynamically scheduling resource requests in a distributed system based on usage quotas. One example method includes identifying usage information for a distributed system including atoms, each atom representing a distinct item used by users of the distributed system; determining that a usage quota associated with the distributed system has been exceeded based on the usage information, the usage quota representing an upper limit for a particular type of usage of the distributed system; receiving a first request for a particular atom requiring invocation of the particular type of usage represented by the usage quota; determining that a second request for a different type of usage of the particular atom is waiting to be processed; and processing the second request for the particular atom before processing the first request.

20 Claims, 5 Drawing Sheets

(56) References Cited

OTHER PUBLICATIONS

Goyal et al., "Start-time Fair Queuing: A Scheduling Algorithm for Integrated Services Packet Switching Networks," Technical Report TR-96-02, Department of Computer Science, University of Texas at Austin, Oct. 1997, 28 pages.

Shue et al., "Performance Isolation and Fairness for Multi-Tenant Cloud Storage," $10^{th}$ USENIX Symposium on Operating Systems Design and Implementation, Oct. 2012, pp. 349-362.

\* cited by examiner

QUOTA-BASED RESOURCE SCHEDULING

CLAIM OF PRIORITY

This application claims priority under 35 USC §119(e) to U.S. Patent Application Ser. No. 62/029,314, filed on Jul. 25, 2014, the entire contents of which are hereby incorporated by reference.

BACKGROUND

Distributed systems include a plurality of computing devices connected by a network. In some cases, the computing devices may be operable to process requests from clients to perform computing tasks. The computing devices may also be configured to cooperate with one another in order to process large computing tasks.

SUMMARY

The present disclosure relates to dynamically scheduling resource requests in a distributed system based on usage quotas.

In general, one innovative aspect of the subject matter described in this specification can be embodied in methods that include the actions of identifying usage information representing usage of a distributed system, the distributed system including atoms, each atom representing a distinct item used by users of the distributed system; determining that a usage quota associated with the distributed system has been exceeded based on the usage information, the usage quota representing an upper limit for a particular type of usage of the distributed system; receiving a first request for a particular atom, the first request requiring invocation of the particular type of usage represented by the usage quota; in response to receiving the first request, determining that a second request for the particular atom is waiting to be processed and that the second request for the particular atom requires invocation of a type of usage different from the particular type of usage, and for which a usage quota has not been exceeded; and in response to determining that the second request is waiting to be processed and that the usage quota for the different type of usage has not been exceeded, processing the second request for the particular atom before processing the first request.

Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. By monitoring usage for a distributed system as a whole and applying usage quotas globally rather than at each node, usage of the distributed system may be managed and scheduled more effectively. Further, by queuing access to particular atoms based on the global usage quotas, access that violates a quota for a particular atom may be curbed so that other requests, such as requests for other atoms serviced by the same resource, may be processed. Processing requests that violate a quota immediately when no other requests are pending also allows greater system utilization, as requests are not needlessly penalized when processing capacity is available. In addition, the present techniques allow the use of simple scheduling algorithms for each resource, allowing scheduling to be performed cheaply to allow a high throughput. By globally enforcing the usage quotas in the system as a whole, a fair access policy may result across the system by utilizing relatively simple scheduling algorithms for each resource.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
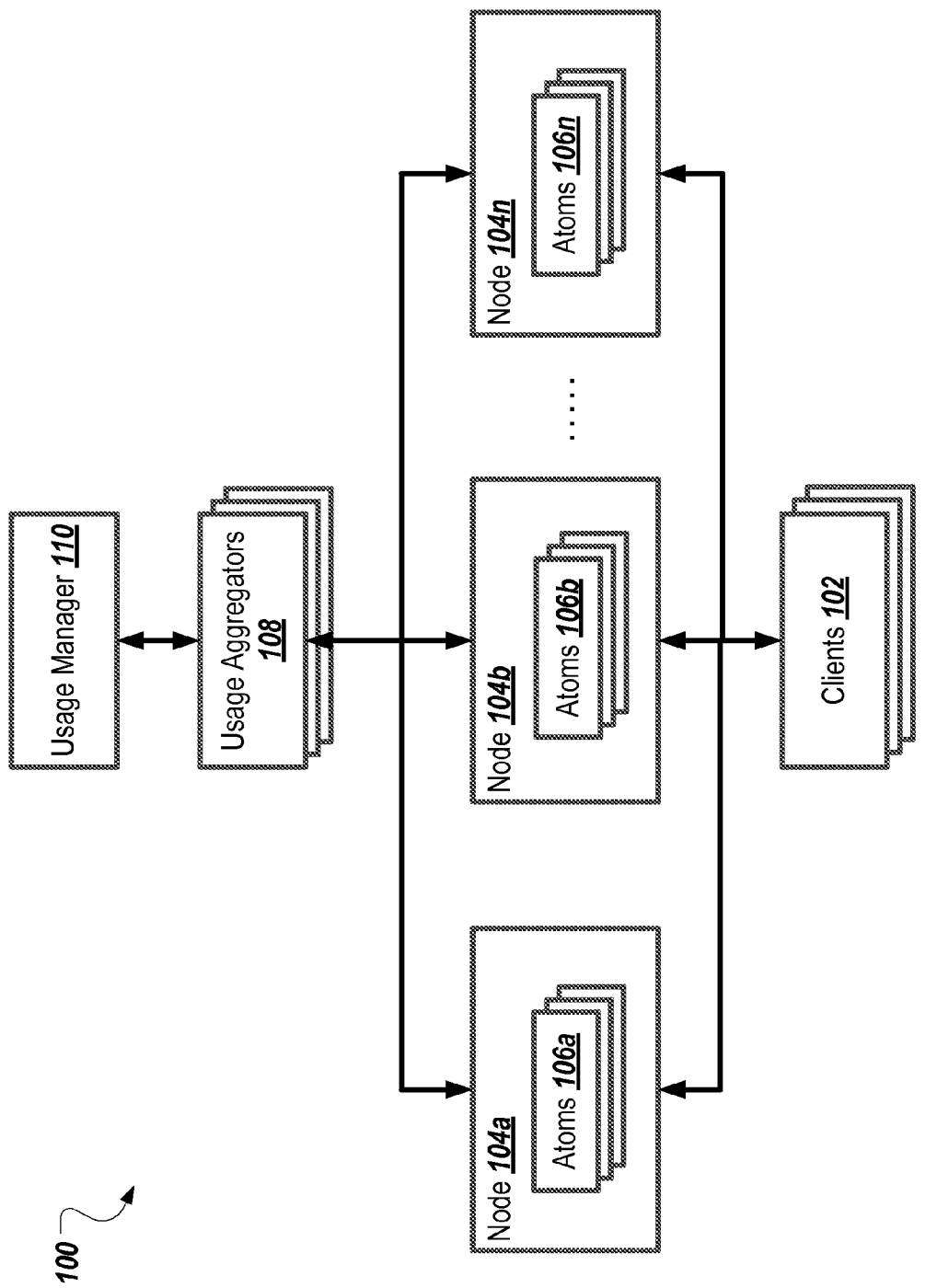
FIG. 1 is a block diagram of an environment in which dynamically scheduling resource requests based on usage quotas can occur.

In computing systems, requests to access shared resources are scheduled to prevent a particular user or a particular type of request from monopolizing a particular shared resource, and thereby preventing other requests for the shared resource from being processed. For example, scheduling prevents a particular user or program from requesting access to a processor and then maintaining exclusive control of the processor for a large amount of time (e.g., several seconds). To allow such behavior may lead to poor overall system performance, as programs or users besides the one controlling the processor may be unable to continue execution until the particular user or program yields the processor. Some computing systems employ complex scheduling algorithms to ensure shared resources are available to all users and programs with minimal delay.

In distributed systems including multiple computing systems, access to shared resources on the different computing systems may also be scheduled, again to prevent the monopolization of the shared resources. In some distributed systems, shared resources may be interchangeable, such that requests for one type of resource may be serviced by several different computing systems within the distributed system. For example, in a distributed system including a plurality of identical computing devices, a request to perform a particular computation may be performed by any free computing device. In such a distributed system, the resources of the computing devices are "fungible," such that any free resource may service the request. Scheduling requests in such a system may involve simply queuing received requests until a free resource is available.

Some distributed systems may also include non-interchangeable ("distinct") shared resources, such that a particular request may only be handled by one or a small number of resources in the distributed system. Each of these distinct resources may service one or more "atoms." For the purposes of this document, an "atom" refers to an item, such as, for example, a piece of data, that can only be requested from a particular set of resources. For example, in a distributed storage system, a particular data block (an atom) may only be stored on certain disks (resources) within the system. Accordingly, a request to access a particular atom (i.e., a data block) may only be serviced by a limited number of resources (i.e., disks) within the distributed storage system.

Scheduling in such a distributed system may be more challenging than in the system with fungible resources described above. Resource contention may be considerably higher in a system with distinct resources, where a small number of resources can service requests for a particular atom. One approach to scheduling for such a distributed system would be to let the individual resources themselves handle scheduling on a per atom basis. However, such an approach may lead to monopolization of resources if clients are issuing requests for a particular atom at a high rate. Another approach would be to allocate each client a particular usage quota per resource or per atom, and throttle request handling for the client once the quota is exceeded. Such an approach may prove inefficient, such as, for example, in situations where a client's requests are being throttled while the requested resource is not in use. For the purposes of the present disclosure, a "client" may be a user, or a program or other process acting on behalf of one or more users.

Accordingly, the present disclosure describes techniques for dynamically scheduling resource requests in a distributed system based on usage quotas. As used herein, a usage quota is an upper limit on a certain type of usage. Specific examples of usage quotas are described below. One example technique for dynamically scheduling resource requests in a distributed system based on usage quotas includes identifying usage information of the distributed system from the various computing devices in the system. Based on the usage information, determinations may be made whether usage quotas for the distributed system as a whole have been exceeded based on the identified usage information. In some cases, the usage quotas may apply to a particular type of usage (e.g., batch queries, low latency queries, usage by a particular user or client, etc.). The usage quota status may be provided to each of the computing devices in the distributed network. The quota status may be used at each computing device to perform request scheduling. For example, if a computing device receives a usage request of a first type for a particular atom, the computing device may determine that a usage quota for the first type of usage has been exceeded. If the computing device has other pending requests for the particular atom of other types for which usage quotas have not been exceeded, the computing device may queue the received usage request at a low priority, such that the other pending requests will be processed first. If the computing device does not have other requests pending for the particular atom, the computing device may service the received request immediately, even though the usage quota has been exceeded Such functionality allows over-quota requests to be serviced immediately if no other requests are pending, thereby allowing higher overall utilization of the distributed systems. Further, the computing device may employ a scheduling algorithm between the normal priority and low priority queues, such that over-quota requests will not be over penalized in cases where a high volume of under-quota requests are received for the particular atom around the same time. In addition, the computing device may maintain queues for different atoms, and may service requests for the different atoms according to a round-robin or other scheduling algorithm. Such an approach may avoid cases where a large volume of requests for one atom monopolize the computing device and delay the processing of requests for other atoms.

These features and additional features are described in more detail below.

FIG. 1 is a block diagram of a distributed system 100 in which dynamically scheduling resource requests based on usage quotas can occur. As shown, the distributed system 100 includes one or more clients 102 in communication with one or more nodes 104a-n. Each of the nodes 104a-n hosts one or more atoms 106a-n. The nodes 104a-n are in communication with one or more usage aggregators 108. The usage aggregators 108 communicate with a usage manager 110. In operation, the clients 102 communicate with the nodes 104a-n to request the atoms 106a-n. The nodes 104a-n communicate information about the usage of the atoms 106a-n to the usage aggregators 108. The usage aggregators 108 communicate this usage information to the usage manager 110. Based on the received usage information, usage manager 110 determines whether usage quotas for particular types of usage have been exceeded for the one or more atoms 106a-n. Usage manager 110 communicates this quota status information to the nodes 104a-n. The nodes 104a-n may schedule requests from the clients 102 for the atoms 106a-n based on the quota status information received from the usage manager 110. For example, the node 104a may receive quota status information from the usage manager 110 indicating that a client 102 has exceeded its usage quota for a particular atom 106a. In response, the node 104a may schedule requests from the client 102 for the particular item 106a at a lower priority, such that other requests for the particular atom 106a from clients that have not exceeded the usage quota may be processed before requests from the client 102. In some cases, the node 104a may process requests from the client 102 for the particular item 106a normally if no other requests are pending, and may delay requests from client 102 if other requests are pending. In this way, the client 102 may not be made to wait for its request to be processed if free processing capacity exists.

Distributed system 100 includes one or more clients 102. In some cases, the clients 102 may be users of the distributed system 100 that request access to the atoms 106a-n hosted on the nodes 104a-n. The clients 102 may be computing devices that communicate requests to and receive responses from the nodes 104a-n, such as, for example, over a network (not shown). Clients 102 may communicate requests to nodes 104a-n using one or more communications techniques, such as, for example, Hypertext Transfer Protocol (HTTP), Simple Object Access Protocol (SOAP), Remote Procedure Call (RPC), Common Object Request Broker Architecture (CORBA), Extensible Markup Language (XML), JavaScript Object Notation (JSON), or other techniques. In some cases, the clients 102 may be software applications running on computing devices and utilizing the nodes 104a-n to perform processing or other tasks.

Distribute system 100 also includes one or more nodes 104a-n. In some cases, the nodes 104a-n may be computing devices interconnected by a communications network and operable to receive and process requests from the one or more clients 102. In some implementations, each of the nodes 104a-n may be identical to one another, on other cases so the nodes 104a-n may be different from other nodes. Each of the nodes 104a-n may be located a separate geographic location within the distributed system 100. For example, each of the nodes 104a-n may be stored in a different data center, and may be connected to the other nodes 104a-n by a global communications network. In some cases, a portion of the nodes 104a-n may be located at the same location.

Each of the nodes 104a-n includes one or more atoms 106a-n. For the purposes of the present disclosure, an "atom" is a distinct item hosted by a node 104a-n. For example, assume atom 106a represents a particular data block stored within the distributed system 100 that can be requested by a plurality of the clients 102. Because the atom 106a represents a particular data block including particular data, requests for the atom 106a can only be processed by nodes 104a-n that host the atom 106a (i.e., node 104a). If the node 104a is busy servicing a request for atom 106a, it may not be capable of servicing requests for other atoms, which may cause the additional request for atoms associated with node 104a to be delayed. The atoms 106a-n may each represent different distinct items of different types, including, but not limited to, data blocks, applications, network locations, or other types of items.

In some implementations, a particular atom may be hosted by a plurality of the nodes 104a-n. For example, assuming again that atom 106a represents a particular data block, the atom 106a may be hosted by node 104a and node 104b in the case that both nodes host particular data block represented by atom 106a. In such a case, either node 104a or node 104b can process a request for atom 106a.

In some cases, each of the atoms 106a-n may be represented within the distributed system 100 by a unique identifier. In such a case, the clients 102 may include the unique identifier when requesting access to a particular atom, and the nodes 104a-n may include the identifiers when reporting usage information for the atoms 106a-n to the usage manager 110.

The distributed system 100 also includes one or more usage aggregators 108 communication with the nodes 104a-n. The usage aggregators 108 may be computing devices in communication with the one or more nodes 104a-n and the usage manager 110. In some cases, the usage aggregators 108 may be operable to receive usage information from the nodes 104a-n regarding usage by the clients 102 of the atoms 106a-n. The usage aggregators 108 may communicate this usage information to the usage manager 110, described below. In some implementations, the usage aggregators 108 may be omitted, and the nodes 104a-n may communicate usage information directly to the usage manager 110.

The distributed system 100 also includes the usage manager 110. The usage manager 110 may be operable to receive usage information related to the usage of the atoms 106a-n by the clients 102 from the usage aggregators 108, or from the nodes 104a-n. In some implementations, the usage manager 110 may determine whether usage quotas associated with different types of usage have been exceeded based on the received usage information. For example, a particular usage quota may specify that a maximum of two batch usage requests may be processed per atom per minute. If the usage manager 110 determines from the received usage information that two batch usage requests for atom 106a are currently being processed, the usage manager 110 may communicate indication to the nodes 104a-n that the particular usage quota has been exceeded. In response, if node 104a receives a batch usage request for atom 106a from client 102, the node 104a may queue the request and allow requests for other types of usage (e.g., low latency requests) to be processed before the batch usage request. The usage quotas may be set by administrators of the distributed system 100, or may be determined automatically by the usage manager 110, such as by analyzing historical usage information. The usage quotas may be associated with different types of usage, including, but not limited to, batch usage (e.g., throughput oriented access over longer time scales), low latency usage (e.g., response-time-sensitive access over shorter time scales), read access, write access, short duration operations (e.g., processing operations that complete in less than a particular amount of time), long-duration operations (e.g., processing operations that complete in more than a particular matter of time), usage requested by a particular client 102, usage requested by clients associated with a particular entity (e.g., a customer paying to use the distributed system 100), or other types of usage. In one example, a particular customer may have an agreement with the owner of the distributed system 100 allowing clients 102 associated with particular customer a certain amount of usage of the distributed system 100. The usage manager 110 may detect that the particular customer has exceeded this amount of usage, and thus violated the usage quota. The user manager 110 may send an indication of this to the nodes 104a-n, which may, in response, de-prioritize requests from clients 102 associated with particular customer. The nodes 104a-n may communicate usage information to the usage manager 110, either via the usage aggregators 108 or correctly, according to one or more communications protocols, including, but not limited to, HTTP, SOAP, RPC, Simple Network Management Protocol (SNMP), or other protocols. In some cases, the usage aggregators 108 may forward usage information received from the nodes 104a-n to the usage manager 110. The usage aggregators 108 may also collect the usage information from the nodes 104a-n and perform processing on the usage information before providing it to the usage manager 110, such as summarization or correlation.

In some cases, the usage information may include indications that a particular client has requested a particular type of usage of a particular atom. For example, if a client 102 requests to read from a particular atom 106a, the node 104a may send an indication to the usage manager 110 identifying the client 102, the atom 106a, and the type of usage requested. The indication may include a unique identifier for the client 102, such as a client identifier or Internet Protocol (IP) address, the unique identifier for the atom 106a, and an identifier representing the usage type (e.g., "read"). In some implementations, the usage information may include a usage summary for a particular client aggregating all the client's usage of all atoms on the node 104a.

The usage manager 110 may communicate quota status information back to the nodes 104a-n, such as indications that a particular usage quota has been exceeded. The quota status information may be communicated from the user manager 110 to the nodes 104a-n via the usage aggregators 108 or correctly. In some cases, the quota status information may be indicated according to the same communications protocol used to communicate the usage information, or by another protocol or combination of protocols. In some implementations, the quota status information may include an action for the nodes 104a-n to perform a received request associated with the usage quota. For example, the quota status information may include an action directing the nodes 104a-n to delay requests associated with the usage quota for a maximum amount of time, process requests associated with the usage quota at a lower weight in a weighted round-robin algorithm, or perform other actions.

Figure 2:
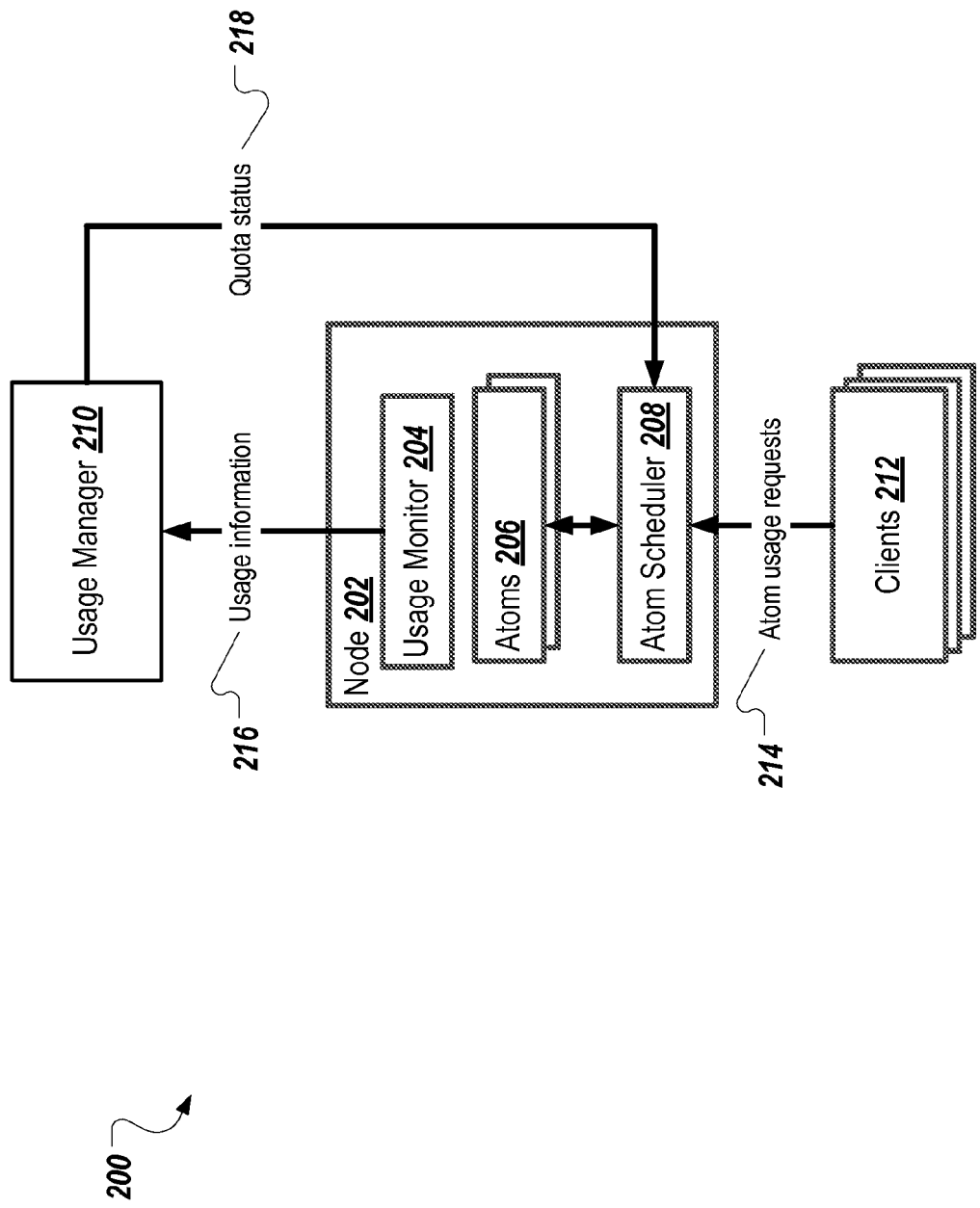
FIG. 2 is a block diagram of a system configuration showing information flow between clients, a node, and a usage manager for scheduling resource requests based on usage quotas.

FIG. 2 is a block diagram of a system 200 showing information flow between clients 212, a node 202, and a usage manager 210 for scheduling resource requests based on usage quotas. In operation, the clients 212 send atom usage requests (214) to the node 202. The node 202 sends usage information (216) based on the received atom usage requests to the usage manager 210. The usage manager 210 communicates quota status information (218) back to the node 202 to indicate how the node 202 should schedule subsequent atom usage requests from the clients 212.

As shown, the node 202 includes a usage monitor 204. In some implementations, the usage monitor 204 may be operable to analyze received usage requests from the clients 212 for the atoms 206 of the resource 209, and calculate usage information 216 to be reported to the usage manager 210. In some cases, the usage monitor 204 may be a software application or set of software applications executed by a processor of the node 202. In some implementations, the usage monitor 204 may be hosted on a computing device external to the node 202, and may monitor the node 202 in order to determine usage information, such as, for example, by monitoring SNMP information reported by the node 202.

The node 202 also includes a resource 209 including one or more atoms 206. The resource 209 may be a component that services requests for the one or more atoms 206, such as, for example, a disk in a storage system in a case where the one or more atoms 206 represent data blocks stored on the disk. The atoms 206 may represent distinct items as described relative to FIG. 1, and may be configured as described relative to FIG. 1. For the sake of brevity, a description of the atoms 206 will not be repeated here.

The node 202 also includes an atom scheduler 208. In operation, the atom scheduler 208 may receive the atom usage request 214 from the clients 212, and may determine how to process the atom usage request 214 based on the quota status 218 received from the usage manager 210. For example, the atom scheduler 208 may receive a request from client 212 to use atom 206. The atom scheduler 208 may have previously received a quota status 218 from the usage manager 210 indicating that the client 212 has exceeded its usage quota. Upon receiving the atom usage request 214 from the client 212, the atom scheduler 208 may, in response to determining that the client 212 has exceeded its quota, determine whether additional requests for the atom 206 are currently pending. If no requests are pending, the atom scheduler 208 may process the atom usage request 214 without delay. If requests for the atom 206 are pending, the atom scheduler 208 may delay the atom usage request 214. For example, the atom scheduler 208 may place the atom usage request 214 into a low priority queue, while the pending requests that do not violate a usage quota are placed into a normal priority queue. In some cases, the atom scheduler 208 may process requests according to a weighted round-robin algorithm, such that requests from the low priority queue are processed less frequently than requests from the normal priority queue. Such an approach may prevent monopolization of the resource 209 by requests associated with violated quotas, but may not delay such requests to such a degree as to cause issues for the clients 212.

Figure 3:
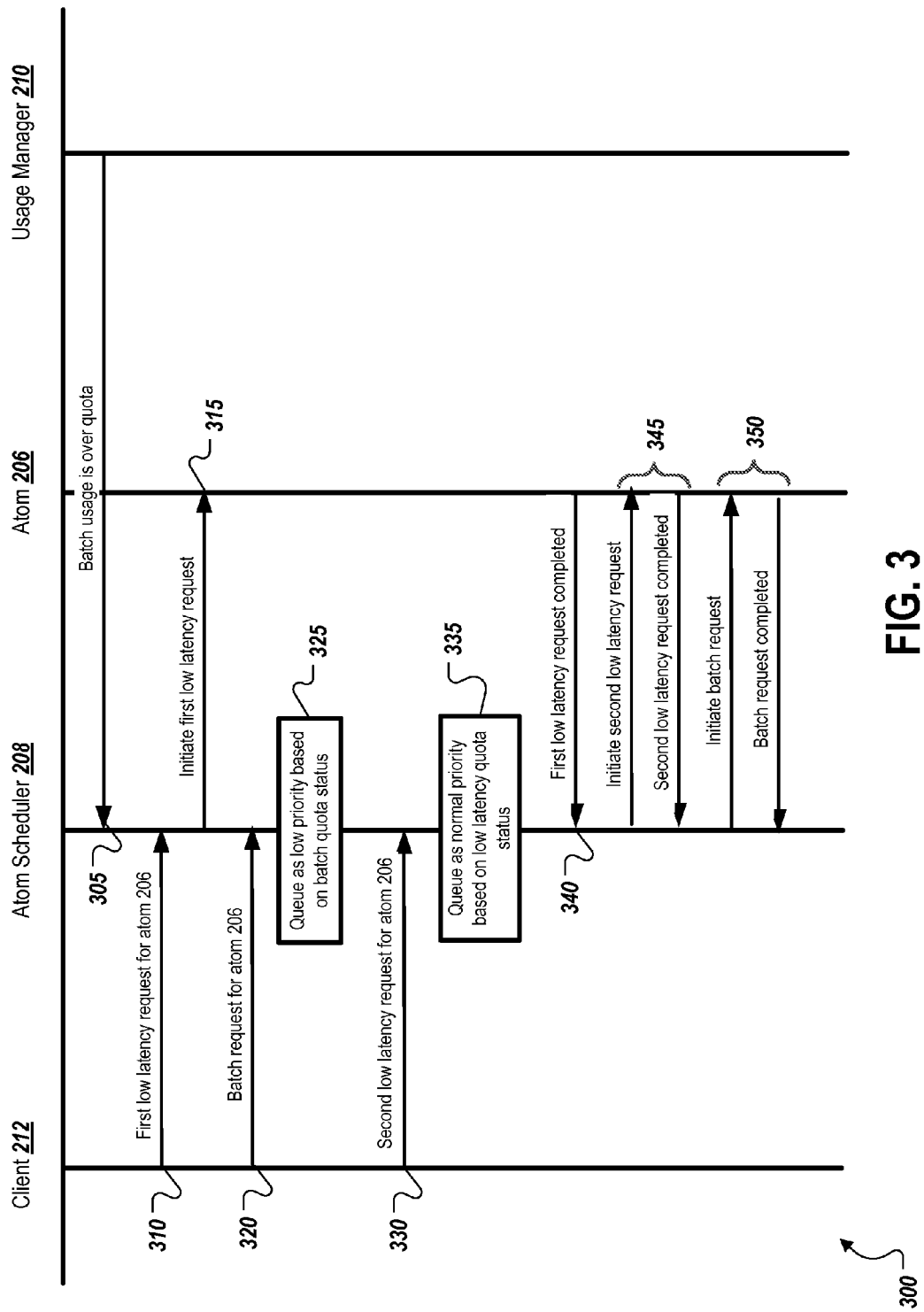
FIG. 3 is a sequence diagram of an example process for dynamically scheduling resource requests based on usage quotas.

FIG. 3 is a sequence diagram of an example process 300 for dynamically scheduling resource requests based on usage quotas. At 305, the usage manager 210 sends an indication to the atom scheduler 208 that batch usage is over quota. The user manager 210 may send this indication in response to determining that a usage quota associated with batch usage has been exceeded based on received usage information.

At 310, the client 212 sends a first low latency request for atom 206 to the atom schedule 208. In this case, the atom scheduler 208 determines that no requests for the atom 206 are currently pending, and, at 315, initiates a first low latency request to the resource 209. The resource 209 begins processing the first low latency request at 315.

At 320, the client 212 sends a batch request for the atom 206 to the atom scheduler 208. The batch request is of a different type than the first low latency request, and is of the same type associated with the usage quota that was indicated to be exceeded by the user manager 210 at 305.

At 325, the atom scheduler 208 queues the batch request as low priority based on the indication that the batch usage quota has been exceeded. At 330, a second low latency request for the atom 206 is received from the client 212 by the atom scheduler 208. In response, at 335, the atom scheduler 208 queues the second low latency request as normal priority, because no quota associated with the request has been violated.

At 340, the resource 209 indicates to the atom scheduler 208 that the first low latency request has completed. In response, the atom schedule 208 initiates the second low latency request at 345. The atom scheduler 208 initiates the second low latency request before initiating the batch request based on the low latency request being in the normal priority queue, and the batch request being in the low priority queue. After the second low latency request has completed, the atom scheduler 208 initiates the batch request at 350.

Figure 4:
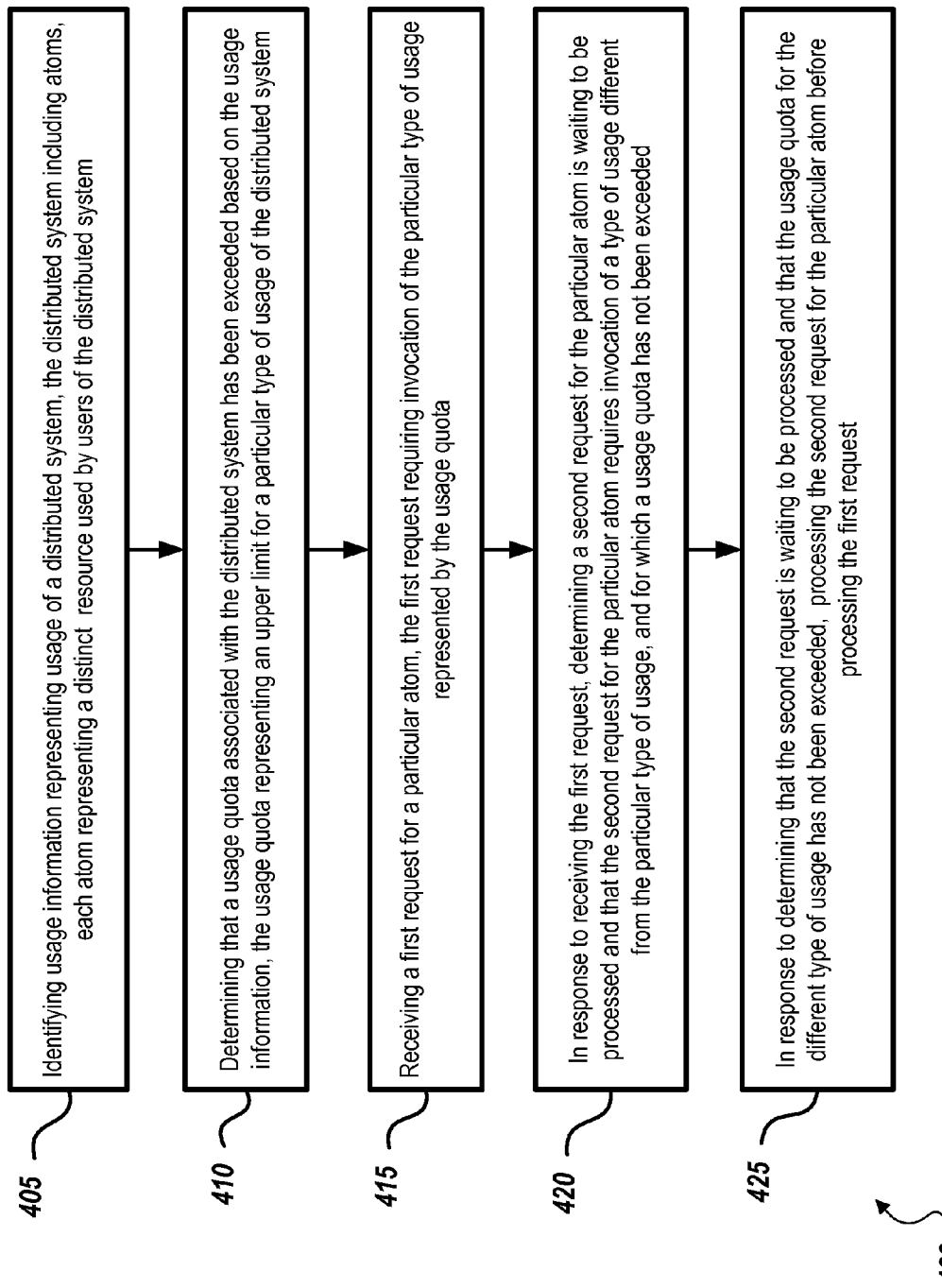
FIG. 4 is a flow diagram of an example process for dynamically scheduling resource requests based on usage quotas.

FIG. 4 is a flow diagram of an example process 400 for dynamically scheduling resource requests based on usage quotas. At 405, usage information representing usage of a distributed system is identified. The distributed system includes atoms representing distinct resources used by users of the distribute system. In some cases, the distributed system is a distributed filesystem and the one or more atoms are data blocks (e.g. chunks) representing data stored by the distributed filesystem.

At 410, a determination is made that a usage quota associated with the distributed system has been exceeded based on the usage information, the usage quota representing an upper limit for particular type of usage of the distributed system. In some implementations, the usage quota includes a storage quota, a bandwidth quota, a request rate quota, a data transfer quota, a disk time quota, a flash time quota, a processing time quota, or other types of quotas. A storage quota specify a maximum amount of storage that can be used (e.g., 400 GB). A bandwidth quota may indicate a maximum amount of network bandwidth that can be consumed (e.g., 5 Mbps). A request rate quota may indicate a maximum rate at which requests may be received (e.g., 4 requests per second). A data transfer quota may specify a maximum amount of data that can be transferred (e.g., 1 GB). A disk or flash time quota may specify a maximum amount of time that can be used performing disk or flash memory operations (e.g., seeking, reading, writing, etc.) when servicing requests. A processing time quota may indicate a maximum processing time that can be used to service requests (e.g. 100 operations per second). In some cases, the usage quota may be a token quota. For example, a client may be allocated tokens at a certain rate (e.g., 10 tokens per second), and each token may entitle the client to one request. Each time the client sends a request, they redeem and lose a token. A client may be allowed to accumulate a maximum number of tokens (e.g., 1000). In such an example, a client may issue requests faster than their token accumulation rate for a limited time if they have extra tokens accumulated.

The particular type of usage may include low latency usage, batch usage, best effort usage, or other types of usage. In some cases, the particular type of usage includes usage by a particular user, and determining that the usage quota associated with the distributed system has been exceeded based on the usage information includes determining that a usage quota associated with the particular user has been exceeded. The usage quota may represent a purchased amount of the particular type of usage associated with a particular user of the distributed system.

At 415, a first request for a particular atom is received, the first request requiring invocation of the particular type of usage represented by the usage quota. Invocation of the particular type of usage may include initiating an operation of the usage type on the particular atom.

At 420, in response to receiving the first request, a determination is made that a second request for the particular atom is waiting to be processed and the second request for the particular atom requires invocation of a type of usage different from the particular type of usage, and for which a usage quota has not been exceeded.

At 425, in response to determining the second request is waiting to be processed and that the usage quota for the different type of usage has not been exceeded, the second request for the particular atom is processed before processing the first request. In some cases, process 400 includes processing additional requests for the particular atom besides the first request that are waiting to be processed before processing the first request, wherein the additional requests are processed in an order determined based on at least one of: a round robin algorithm or a fair queuing algorithm. In some implementations, a fair queuing algorithm is an algorithm that estimates the finishing time for each queued request, and processes requests with shorter finishing times before those with longer finishing times.

The process 400 may also include receiving a third request for the particular atom, the third request requiring invocation the particular type of usage represented by the usage quota. in response to receiving the third request, a determination may be made that no requests for the particular atom besides the third request are waiting to be processed. In response to determining that no requests for the particular atom besides the third request are waiting to be processed, the third request for the particular atom may be processed.

In some cases, the particular atom may be a first atom associated with a resource of the distributed system, and the process 400 may also include receiving a request for a second atom associated with a resource and different than the first atom, the request requiring invocation of a type of usage different from the particular type of usage, and for which a usage quota has not been exceeded, and in response to receiving the request for the second atom, processing the request for the second atom before processing the first request. In some cases, the first atom and the second atom may be data blocks, and the resource may be a disk storing the data blocks.

Figure 5:
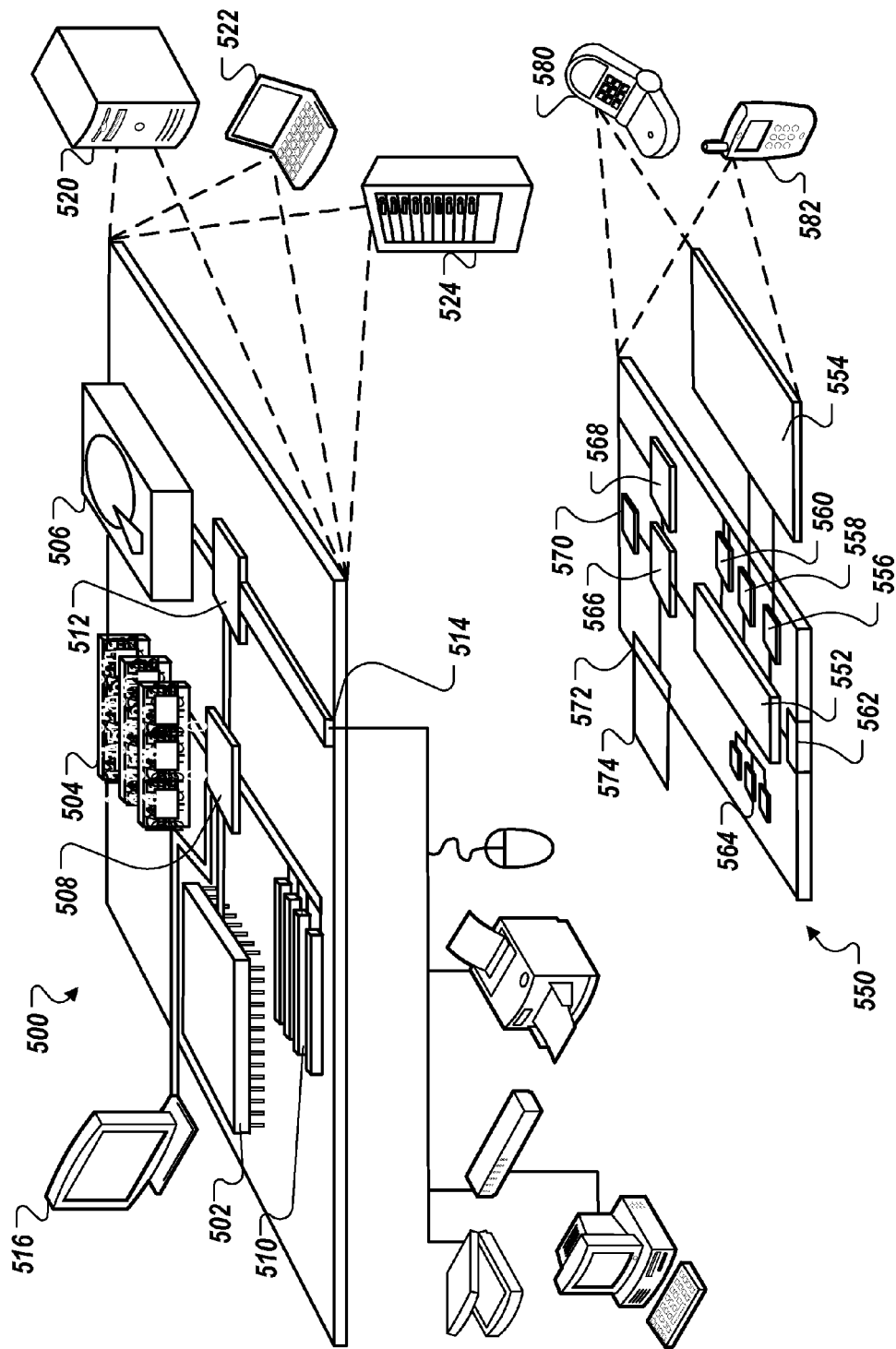
FIG. 5 is a block diagram of an example computing device.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed interface 508 manages bandwidth-intensive operations for the computing device 500, while the low speed interface 512 manages lower bandwidth-intensive operations. Such allocation of functions is exemplary only. In one implementation, the high-speed interface 508 is coupled to memory 504, display 516 (e.g., through a graphics processor or accelerator), and to high-speed expansion ports 510, which may accept various expansion cards (not shown). In the implementation, low-speed interface 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or an MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory 564 may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a filesystem. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a user computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include users and servers. A user and server are generally remote from each other and typically interact through a communication network. The relationship of user and server arises by virtue of computer programs running on the respective computers and having a user-server relationship to each other. In some embodiments, a server transmits data (e.g., an HTML page) to a user device (e.g., for purposes of displaying data to and receiving user input from a user interacting with the user device). Data generated at the user device (e.g., a result of the user interaction) can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method executed by one or more processors, the method comprising:
    identifying usage information representing usage of a distributed system, the distributed system including atoms, each atom representing a distinct item used by users of the distributed system;
    determining that a usage quota associated with the distributed system has been exceeded based on the usage information, the usage quota representing an upper limit for a particular type of usage of the distributed system;
    receiving a first request for a particular atom, the first request requiring invocation of the particular type of usage represented by the usage quota;
    in response to receiving the first request, determining that a second request for the particular atom is waiting to be processed and that the second request for the particular atom requires invocation of a type of usage different from the particular type of usage, and for which a usage quota has not been exceeded; and
    in response to determining that the second request is waiting to be processed and that the usage quota for the different type of usage has not been exceeded, processing the second request for the particular atom before processing the first request.

2. The method of claim 1, further comprising:
    receiving a third request for the particular atom, the third request requiring invocation the particular type of usage represented by the usage quota;
    in response to receiving the third request, determining that no requests for the particular atom besides the third request are waiting to be processed; and
    in response to determining no requests for the particular atom besides the third request are waiting to be processed, processing the third request for the particular atom.

3. The method of claim 1, wherein the usage quota includes at least one of: a storage quota, a bandwidth quota, a request rate quota, a data transfer quota, a disk time quota, a flash time quota, or a processing time quota.

4. The method of claim 1, wherein the particular type of usage includes low latency usage, batch usage, or best effort usage.

5. The method of claim 1, wherein the particular type of usage includes usage by a particular user, and determining that the usage quota associated with the distributed system has been exceeded based on the usage information includes determining that a usage quota associated with the particular user has been exceeded.

6. The method of claim 1, wherein the distributed system is a distributed filesystem and the one or more atoms are data blocks representing data stored by the distributed filesystem.

7. The method of claim 1, wherein the usage quota represents a purchased amount of the particular type of usage associated with a particular user of the distributed system.

8. The method of claim 1, wherein the particular atom is a first atom, the first atom associated with a resource of the distributed system, the method further comprising:
    receiving a request for a second atom associated with the resource and different than the first atom, the request requiring invocation of a type of usage different from the particular type of usage, and for which a usage quota has not been exceeded; and
    in response to receiving the request for the second atom, processing the request for the second atom before processing the first request.

9. The method of claim 8, further comprising processing the first request for the first atom, the second request for the first atom, and the request for the second atom in an order determined based on at least one of: a round robin algorithm or a fair queuing algorithm.

10. The method of claim 8, wherein the first atom and the second atom are data blocks, and the resource is a disk storing the data blocks.

11. A non-transitory, computer-readable medium storing instructions operable when executed to cause at least one processor to perform operations comprising:
    identifying usage information representing usage of a distributed system, the distributed system including atoms, each atom representing a distinct item used by users of the distributed system;

determining that a usage quota associated with the distributed system has been exceeded based on the usage information, the usage quota representing an upper limit for a particular type of usage of the distributed system;

receiving a first request for a particular atom, the first request requiring invocation of the particular type of usage represented by the usage quota;

in response to receiving the first request, determining that a second request for the particular atom is waiting to be processed and that the second request for the particular atom requires invocation of a type of usage different from the particular type of usage, and for which a usage quota has not been exceeded; and in response to determining that the second request is waiting to be processed and that the usage quota for the different type of usage has not been exceeded, processing the second request for the particular atom before processing the first request.

12. The computer-readable medium of claim 11, the operations further comprising:

receiving a third request for the particular atom, the third request requiring invocation the particular type of usage represented by the usage quota;

in response to receiving the third request, determining that no requests for the particular atom besides the third request are waiting to be processed; and in response to determining no requests for the particular atom besides the third request are waiting to be processed, processing the third request for the particular atom.

13. The computer-readable medium of claim 11, wherein the usage quota includes at least one of: a storage quota, a bandwidth quota, a request rate quota, a data transfer quota, a disk time quota, a flash time quota, or a processing time quota.

14. The computer-readable medium of claim 11, wherein the particular type of usage includes low latency usage, batch usage, or best effort usage.

15. The computer-readable medium of claim 11, wherein the particular type of usage includes usage by a particular user, and determining that the usage quota associated with the distributed system has been exceeded based on the usage information includes determining that a usage quota associated with the particular user has been exceeded.

16. The computer-readable medium of claim 11, wherein the distributed system is a distributed filesystem and the one or more atoms are data blocks representing data stored by the distributed filesystem.

17. The computer-readable medium of claim 11, wherein the usage quota represents a purchased amount of the particular type of usage associated with a particular user of the distributed system.

18. The computer-readable medium of claim 11, wherein the particular atom is a first atom, the first atom associated with a resource of the distributed system, the operations further comprising:

receiving a request for a second atom associated with the resource and different than the first atom, the request requiring invocation of a type of usage different from the particular type of usage, and for which a usage quota has not been exceeded; and in response to receiving the request for the second atom, processing the request for the second atom before processing the first request.

19. The computer-readable medium of claim 18, the operations further comprising processing the first request for the first atom, the second request for the first atom, and the request for the second atom in an order determined based on at least one of: a round robin algorithm or a fair queuing algorithm.

20. A system comprising:

memory for storing data; and one or more processors operable to perform operations comprising:

identifying usage information representing usage of a distributed system, the distributed system including atoms, each atom representing a distinct item used by users of the distributed system;

determining that a usage quota associated with the distributed system has been exceeded based on the usage information, the usage quota representing an upper limit for a particular type of usage of the distributed system;

receiving a first request for a particular atom, the first request requiring invocation of the particular type of usage represented by the usage quota;

in response to receiving the first request, determining that a second request for the particular atom is waiting to be processed and that the second request for the particular atom requires invocation of a type of usage different from the particular type of usage, and for which a usage quota has not been exceeded; and in response to determining that the second request is waiting to be processed and that the usage quota for the different type of usage has not been exceeded, processing the second request for the particular atom before processing the first request.

* * * * *